United States Patent
McNelley et al.

(10) Patent No.: US 8,290,836 B2
(45) Date of Patent: Oct. 16, 2012

(54) IDENTIFICATION AND RISK EVALUATION

(75) Inventors: Julie McNelley, Oakland, CA (US);
Ryan Talbert, Cave Creek, AZ (US);
Mike Gross, Chandler, AZ (US)

(73) Assignee: Early Warning Services, LLC,
Scottsdale, AZ (US)

( * ) Notice: Subject to any disclaimer, the term of this patent is extended or adjusted under 35 U.S.C. 154(b) by 1192 days.

(21) Appl. No.: 11/159,813

(22) Filed: Jun. 22, 2005

(65) Prior Publication Data

US 2006/0293981 A1 Dec. 28, 2006

(51) Int. Cl.
*G06Q 40/00* (2012.01)
(52) U.S. Cl. ......................................... 705/35
(58) Field of Classification Search .............. 705/35–40
See application file for complete search history.

(56) References Cited

U.S. PATENT DOCUMENTS

| | | | |
|---|---|---|---|
| 5,696,907 A * | 12/1997 | Tom | 705/38 |
| 5,732,400 A * | 3/1998 | Mandler et al. | 705/26 |
| 7,177,846 B2 | 2/2007 | Moenickheim et al. | |
| 2004/0153663 A1 * | 8/2004 | Clark et al. | 713/200 |

* cited by examiner

*Primary Examiner* — Thomas M Hammond, III
(74) *Attorney, Agent, or Firm* — Kilpatrick Townsend & Stockton LLP (57) ABSTRACT

Methods, systems, and machine-readable media are disclosed for identification of an individual and evaluation of risk from doing business with that individual. In one embodiment a method of evaluating a risk from conducting business with an individual comprises receiving identity information related to the individual. The identity information includes information from an identity credential presented by the individual. The identity credential is validated based on the information from the identity credential and one or more positive databases. An identity of the individual is verified based on the identity information and the one or more positive databases. The identity information is screened against one or more negative databases indicating past losses to one or more entities. Results of the screening are reported based on one or more criteria of an entity considering doing business with the individual.

23 Claims, 6 Drawing Sheets

IDENTIFICATION AND RISK EVALUATION

BACKGROUND OF THE INVENTION

Customers of various businesses, such as retail merchants, government entities or financial institutions, are often required to present an identification to complete a transaction. For example, financial institutions usually require customers to present an identification to complete a withdrawal or deposit transaction, cash a check, or open a new account. Unfortunately, a number of advances have been made in counterfeiting technology which make it increasingly difficult for the naked eye to distinguish legally issued identification documents from fraudulent identification documents.

Since enactment of the USA Patriot Act, identity verification has become even more important to financial institutions and other types of businesses. Under Section 326 of the Act, financial institutions must institute a Customer Identification Program (CIP) that contains reasonable risk-based procedures to collect identifying information about customers opening an account, verify that customers are who they say they are to the extent reasonable and practicable, maintain records of customer information and methods used to verify their identity, and determine whether the customer appears on any list of suspected terrorists or terrorist organizations.

Additionally, with the rise of identity theft and other forms of fraud, financial institutions and other businesses seek new ways to evaluate the risk of doing business with a particular individual or other entity. That is, before initiating a transaction with a particular individual or entity, businesses want to know whether that individual or entity presents a risk of losses due to fraud, account abuse, or other reasons. Further, if an individual or entity presents some risk, the businesses want to know how much risk and what kind of risk so that they can evaluate whether they want to do business with this entity and, if they do decide to do business, what kind of services and/or transactions they want to offer.

BRIEF SUMMARY OF THE INVENTION

Methods, systems, and machine-readable media are disclosed for identification of an individual or other entity and evaluation of risk from doing business with that individual or entity. In one embodiment, a method of evaluating a risk from conducting business with an individual comprises receiving identity information related to the individual. The identity information can include information from an identity credential presented by the individual. The identity credential can be validated based on the information from the identity credential and one or more positive databases. An identity of the individual can be verified based on the identity information and the one or more positive databases. The identity information can be screened against one or more negative databases indicating past losses to one or more entities. Results of the screening can be reported based on one or more criteria of an entity considering doing business with the individual.

According to one embodiment, screening can further comprise generating a score for one or more past losses associated with the individual in response to finding the identity information for the individual in the one or more negative databases. The score can be based on one or more criteria of the entity considering doing business with the individual. Reporting results of the screening can comprise reporting the score in a format selected by the entity considering doing business with the individual.

The information indicating past losses to one or more entities in the negative databases can be submitted to the negative databases by the one or more entities incurring the past losses. According to one embodiment, a fee can be credited to the one or more entities submitting the information indicating past losses. The information can indicate past losses due to fraud by the individual, account abuse by the individual, or losses due to the individual being a victim of identity theft. In some cases, the information indicating past losses can separately indicate losses of fee revenue and losses of principal.

According to another embodiment, the method comprises receiving identity information related to an individual. The identity information can include information from an identity credential presented by the individual. A validity rating can be generated for the identity credential based on the information from the identity credential and one or more positive databases. A verification rating can be generated for an identity of the individual based on the identity information and the one or more positive databases. A risk rating can be generated for the individual based on the identity information, one or more negative databases indicating past losses to one or more entities, and risk criteria provided by an entity considering doing business with the individual. The risk rating for the individual can be reported based on one or more report criteria of the entity considering doing business with the individual.

The information indicating past losses to one or more entities in the negative databases can be submitted to the negative databases by the one or more entities incurring the past losses. A fee can be credited to the one or more entities submitting the information indicating past losses. The information can indicate past losses due to fraud by the individual, past losses due to account abuse by the individual, or past losses due to the individual being a victim of identity theft. In some cases, the information indicating past losses can separately indicate losses of fee revenue and losses of principal.

According to yet another embodiment, a system for identification and risk evaluation comprises a processor and a memory communicatively connected with and readable by the processor. The memory contains instructions which, when executed by the processor, cause the system to receive identity information related to an individual. The identity information includes information from an identity credential presented by the individual. The identity credential is validated based on the information from the identity credential and one or more positive databases. An identity of the individual is verified based on the identity information and the one or more positive databases. The identity information is screened against one or more negative databases indicating past losses to one or more entities. Results of the screening are reported based on one or more criteria of an entity considering doing business with the individual.

According to one embodiment, screening can further comprise generating a score for one or more past losses associated with the individual in response to finding the identity information for the individual in the one or more negative databases. The score can be based on one or more criteria of the entity considering doing business with the individual. Reporting results of the screening can comprise reporting the score in a format selected by the entity considering doing business with the individual.

The information indicating past losses to one or more entities in the negative databases can be submitted to the negative databases by the one or more entities incurring the past losses. A fee can be credited to the one or more entities submitting the information indicating past losses. The information can indicate past losses due to fraud by the individual, account abuse by the individual, or losses due to the individual being a victim of identity theft. In some cases, the information indicating past losses can separately indicate losses of fee revenue and losses of principal.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Figure 1:
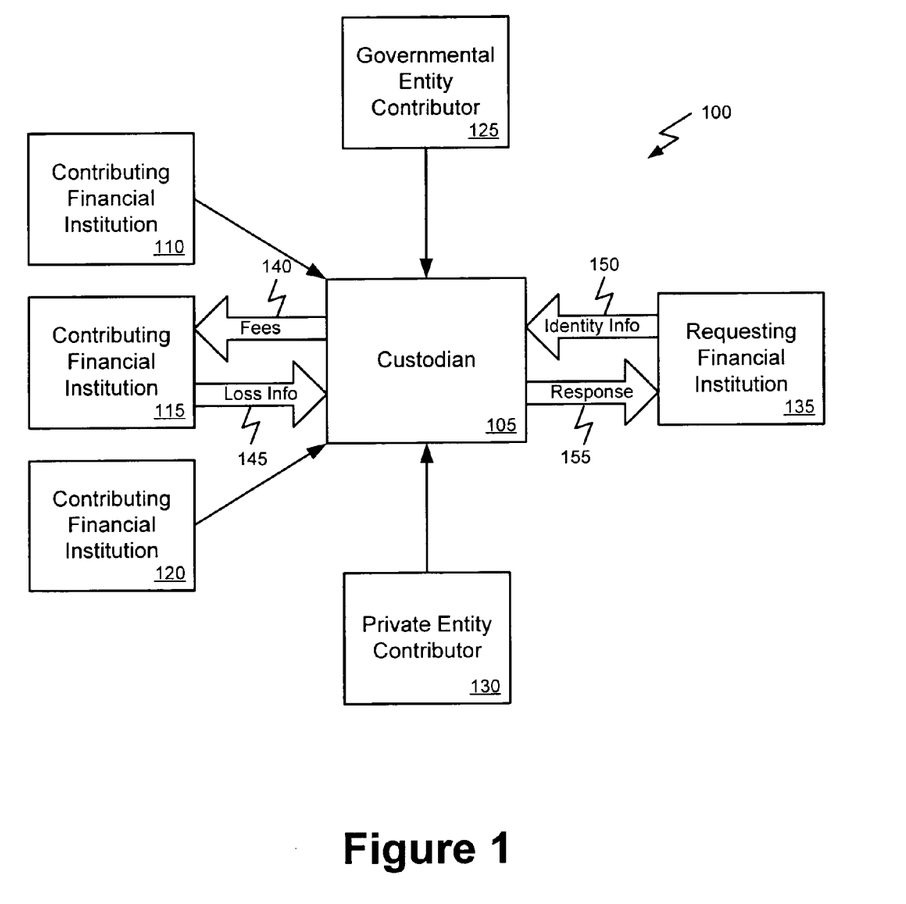
FIG. 1 is a block diagram conceptually illustrating an exemplary environment in which a trusted custodian system may be implemented.

FIG. 1 conceptually illustrates an exemplary environment in which a trusted custodian system may be implemented. As illustrated here, this environment 100 includes a custodian system 105, a number of contributors 110-130, and a requester, in this case, requesting financial institution 135. As used herein, the term requestor can refer to a financial institution, such as requesting financial institution 135, or other entity which is seeking to identify and evaluate an individual or entity it is considering doing business with. The term contributor can refer to an entity that contributes information to the custodian system 105 to help identify and evaluate an individual or entity a requester is considering doing business with. As will be seen, any given entity connected with the custodian system 105 can act as either a contributor or a requestor at any given time. The contributors 110-130 and requesting financial institution 135 may be communicatively connected with the custodian system 105 in a variety of ways including, but not limited to, a wire or wireless Local Area Network (LAN), Wide Area Network (WAN), the Internet, or other common communications media.

Generally speaking, custodian system 105 maintains a number of databases that it uses to rate or score an individual seeking to do business with a particular financial institution such as requesting financial institution 135 or other type of entity connected with custodian system 105. As will be seen, custodian system 105 can accept identity information 150 from the requesting financial institution 135 or other source. The identity information 150 can relate to an individual seeking to do business with the requesting financial institution 135 such as when opening an account, seeking a loan, etc. As will be discussed in detail below, this information can include a variety of information useful in identifying the individual to which it relates. The custodian system 105 checks this information against its databases and rates or scores the individual for whom the identity information 150 has been submitted.

The rating or score can be based on a number of criteria submitted by the requesting financial institution 135 and used to generate a customized response 155 indicating a level of risk associated with doing business with the individual. According to one embodiment, this customized response 155 can comprise an overall score or rating for the entity represented by the identity information 150 and may be based on a number of rating criteria previously submitted to the custodian system 105 by the requesting financial institution 135.

Contributors 110-130 can comprise a variety of different entities and entity types. In many cases, the contributors can be a number of different financial institutions such as banks, credit card companies, lenders, and other entities offering financial services. Typically, contributing financial institutions 110-120 can contribute data used to build and maintain databases used by the custodian system 105 to make determinations on or score various individuals with which the contributing financial institutions 110-120 have done business. For example, one financial institution 115 may have information about an individual that it has dealt with in the past. That information may be particularly useful to another institution when the same individual attempts to open a new account at the other institution. Subject to operating rules implemented by the custodian system to maintain the quality of the information, such information can be submitted to the custodian system 105 for possible use by a requesting financial institution 135.

For example, contributing financial institution 115 may, in the normal course of business, detect a loss associated with a particular individual (i.e., John Doe). While investigating this loss, the financial institution 115 may detect certain patterns of transactions by Mr. Doe that are typically associated with fraudulent behavior. Knowledge of this activity may be particularly useful to requesting financial institution 135 if Mr. Doe is attempting to open an account or conduct business with requesting financial institution 135. Therefore, contributing financial institution 115 can submit loss information 145 related to Mr. Doe's activity to custodian system 105 to be stored in the databases of custodian system 105 for use in scoring or ranking Mr. Doe when identity information 150 related to Mr. Doe is submitted by requesting financial institution 135, i.e., when Mr. Doe tries to do business with requesting financial institution 135. Therefore, the custodian system 105 can discover, and requesting financial institution 135 can learn, that Mr. Doe may present some risk of loss. In return, contributing financial institution 115 may receive fees 140 from the custodian 105 when the contributed loss information 145 is used by the requesting financial institution 135. That is, the operator of the custodian system 105 may charge requesting financial institution 135 a fee for use of its services. Whenever information submitted by a contributor is used by a requester, the custodian may share a portion of the fees collected from the requestor with the contributor to encourage submission of the information.

Other contributors may include governmental entities 125 as well as private entities 130 other than financial institutions. For example, governmental entity contributor 125 may represent the Social Security Administration that may be used as a source of information regarding current, active Social Security numbers useful in determining whether a Social Security number submitted as part of identity information 150 by requesting financial institution 135 is valid and/or corresponds to other information about the individual. In another example, governmental entity contributor 125 may represent a Department of Motor Vehicles that can provide information that may be useful in determining whether a driver's license number or other information submitted as part of identity information 150 by requesting financial institution 135 is valid and/or corresponds to other information about the individual. Private entity contributor 130 may represent any of a number of free or pay services offering information that may be useful to the custodian system 105 in identifying and/or evaluating an entity related to identity information 150 submitted by a requestor. For example, private entity contributor 130 may represent an online search engine or directory or database of various records or information. Importantly, while only one governmental entity contributor 125 and one private entity contributor 130 are shown in this example, any number of contributors of various types may be present in practice.

A requester, such as requesting financial institution 135, can comprise any one or more of a variety of different types of entities. For example, the requesting financial institution 135 may be a bank, credit card company, other lender, or other entity offering financial services. In other cases, the requestor may not be a financial institution but may be another type of entity such as a merchant or other type of business.

In many cases, a financial institution will require an individual to present identification to verify the individual's identity in order to complete a transaction or otherwise conduct business. Therefore, requesting financial institution 135 or other requestor may use reader devices to read encoded data on identification credentials such as driver's licenses. For example, reader devices may be magnetic card readers, two-dimensional bar code readers, smart chip readers, or other type of reader device used to read data encoded on identifications. Alternatively, the requesting financial institution 135 or other requestor may obtain identification information from the individual in other ways. For example, the requestor may manually read a driver's license number, social security number, and/or other identification information supplied by the individual through an identity credential like a passport, drivers license, military ID, etc.

In summary, the custodian system 105 can gather information from a number of contributors 110-130 and can use this information to build and maintain a number of databases. As will be seen, these databases can include a variety of positive as well as negative information. For example, positive information contributed by a governmental entity such as the Social Security Administration of the Department of Motor Vehicles of a particular state can be useful in validating a credential presented by an individual opening an account and/or verifying the identity of that individual. That is, such information can be used to determine whether the credential presented is real or valid and whether the credential actually belongs to the individual using it. Negative information contributed by various financial institutions may be useful in determining whether the individual is credit worthy or is otherwise desirable to do business with. For example, information contributed by one financial institution may indicate a past history of losses associated with a particular individual. Further, such information is, from time to time, updated by the custodian and the contributors. For example, a record of a loss associated with an individual and submitted by contributing financial institution 115 may be updated when the individual takes corrective action, such as paying an overdraft, to remedy the loss. In such a case, the custodian system 105 may retain the original record of the loss but update it to indicate that corrective action was taken. Also, it should be understood that, from time to time, a given financial institution or other entity may act as either a contributor or a requester. That is, a particular entity may periodically submit information to the custodian for use in one or more of its databases and then, at other times, request rating or scoring of an individual seeking to do business with that entity.

When requesting financial institution 135 initiates or conducts business with an individual, it can obtain identity information from that individual and send it to the custodian. The custodian system receives the identity information related to the individual. The identity information typically includes information from an identity credential such as a driver's license presented by the individual. The custodian system validates the identity credential based on the information from the identity credential and one or more positive databases. The custodian system then verifies the identity of the individual based on the identity information and the one or more positive databases and screens the identity information against one or more negative databases indicating past losses to one or more entities. In some cases, such as when reading information from a magnetic strip on a driver's license, verification may also include algorithms for decoding information contained therein and/or verifying the format of such data. The custodian system then reports results of said screening based on one or more criteria of an entity considering doing business with the individual. Additional details of the custodian system and the function performed therein will be discussed below with reference to FIGS. 3-6.

Figure 2:
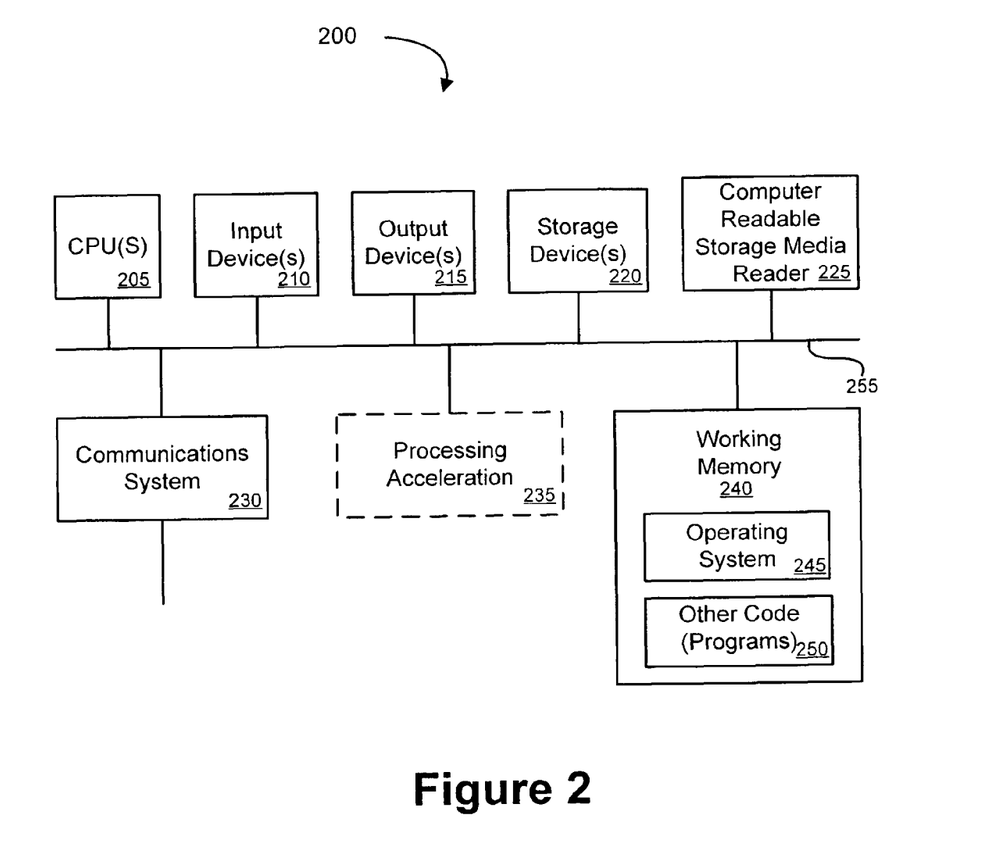
FIG. 2 is a block diagram illustrating an exemplary computer system upon which various elements of the exemplary environment illustrated in FIG. 1 may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
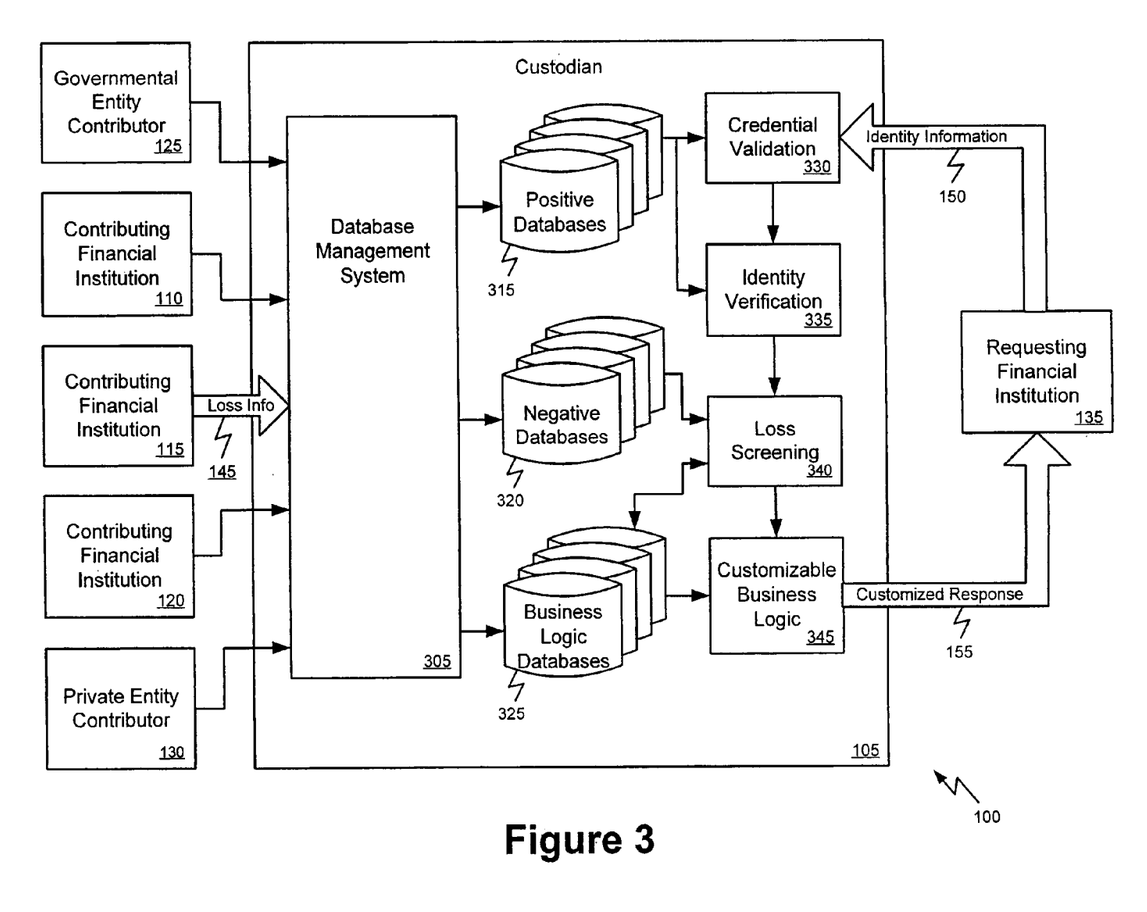
FIG. 3 is a block diagram illustrating functional components of a custodian system according to one embodiment.

FIG. 3 is a block diagram illustrating functional components of a custodian system according to one embodiment. This example illustrates the contributors 110-130, custodian system 105 and requesting financial institution 135 as discussed above. The custodian system 105 includes a database management system 305, a number of positive databases 315, negative databases 320, and business logic databases 325, and a number of processes or operational modules 330-345.

Loss information 145 submitted by contributors 110-130 to custodian system 105 can be used by database management system 305 to build and maintain a number of positive databases 315, negative databases 320, and business logic databases 325. Positive databases 315 can contain information useful to identify and/or verify an entity related to identity information 150 submitted by requesting financial institution 135. Negative databases 320 can include information useful in identifying fraud, account abuse, or other losses associated with a particular individual or entity. Business logic databases can include information or criteria related to how a particular requester may wish to score or rate particular behaviors or information associated with an individual and how the requestor wants to have that information reported. Some exemplary databases, the data they may contain, and how they may be used will be discussed in greater detail below with reference to FIG. 4.

Processes or operational modules performed or operated by custodian system 105 include credential validation 330, identity verification 335, screening 340, and customizable business logic 345. In operation, when the custodian system 105 receives identity information 150 from requesting financial institution 135, these processes are performed to validate and verify the identity information and to rate or score the entity represented by this information so that the requestor can determine the risk or value in doing business with that entity.

Therefore, when a requesting financial institution 135 first encounters an entity with which they may do business, the requesting financial institution 135 obtains some identity information from that entity. For example, the requesting financial institution 135 may swipe or read a driver's license of the individual, request a social security number, require a home address and phone number, etc. Requesting financial institution 135 then sends this identity information 150 to the custodian for evaluation.

The custodian system 105 receives the identity information 150 from the requesting financial institution 135 and performs credential validation 230 and identity verification 335 using information from positive databases 315 generated and maintained by database management system 305 with data from contributors 110-130 or generated or obtained by the custodian system by other means. Credential validation 330 determines whether the credentials used by the individual to provide the identity information 150 are valid, i.e., not forged, altered, expired, etc. while identity verification 335 determines whether the identity information 150 actually belongs to the individual presenting it, i.e., whether the individual presenting the credential is who he claims to be. Details of exemplary credential validation 330 and identity verification 335 processes are disclosed in U.S. patent application Ser. No. 11/031,469 entitled "Identity Verification Systems and Methods," filed on Jan. 6, 2005, the details of which are herein incorporated by reference.

The identity information 150 submitted to the custodian system 105 by requesting financial institution 135 can then be screened 340 against one or more negative databases. As outlined above, the negative databases 320 can comprise loss information 145 related to fraud, account abuses, or other losses submitted by one or more contributors 110-130. For example, contributing financial institution 115 may have submitted loss information 145 related to a loss it incurred when dealing with Mr. John Doe. This loss information 145 can be added to and maintained in the one or more negative databases 320 by database management system 305 and searched against by screening process or operational module 340. Therefore, the loss suffered by contributing financial institution 115 can be discovered and used to score or rate Mr. Doe when his identity information 150 is submitted by requesting financial institution 135.

As mentioned above, the custodian system may share fees with the contributing financial institution 115 that supplied the loss information 145 used by the requesting financial institution 135. That is, the contributing financial institution can be paid when the information it supplies adds value to the negative databases and is useful to a requesting financial institution. In this case, the screening process of the custodian system may update the business logic databases 325 or take another action to track and/or credit these to the contributing financial institution 115.

As will be discussed in greater detail below, screening 340 can be customized by the requester. Since not all losses suffered by contributors may be considered relevant to the requesting financial institution 135, information previously submitted to the custodian system 105 by the requesting financial institution 135 and stored by database management system 305 in one or more business logic databases 325 can be used by screening process 340 to determine which negative information may be relevant to the requesting financial institution 135. For example, one particular financial institution may be extremely conservative and may want to learn about any loss associated with an individual at any time by any contributor. Another requestor may be somewhat less conservative and may have different criteria for searching the negative databases. Such a requestor may want to search only for losses of greater than some predefined dollar amount. Yet another requestor may be interested only in losses of more than a certain dollar amount and only those occurring within a certain time period such as the past year or two years.

Results of credential validation 330, identity verification 335, and screening 340 can then be aggregated and/or summarized by customizable business logic 345 using information previously submitted to the custodian system 105 by the requesting financial institution 135 and stored by database management system 305 in one or more business logic databases 325 to provide a customized response 155 to the requesting financial institution 135. Such information can be submitted to the custodian system 105 online via any of a variety of communication means, by written request, etc. This information may also be configurable by the requestor on an ongoing and/or periodic basis. Therefore, the requestor can change screening criteria as business practices and requirements change.

For example, responses can, according to one embodiment, be given in the form of various messages indicating the level of confidence the requestor can have in doing business with the individual. The messages may be text based, numeric, graphical or another format. The rating or score of an individual, as a result of the credential validation, identity verification, and screening processes, can be used to determine what level of indication or type of message to give. As such, various requesters may indicate a different score to trigger each level. That is, one requestor may request a cautionary or warning message at a higher or lower score than another requestor. Various other types of responses may also be given. For example, a raw score, as the result of the credential validation, identity verification, and screening processes may be given to the requestor rather than messages. In another example, the response may be a rating on a numeric scale such as 1 to 5, or 1 to 10, etc. According to one embodiment, the type of response may vary depending upon the requestor and the information for that requester in the business logic database. Therefore, the requestor can customize what data they see and how it is presented. As with the screening criteria, reporting criteria can be submitted to the custodian system 105 online via any of a variety of communication means, by written request, etc. This information may also be configurable by the requestor oh an ongoing and/or periodic basis. Therefore, the requestor can change screening criteria as business practices and requirements change.

Figure 4:
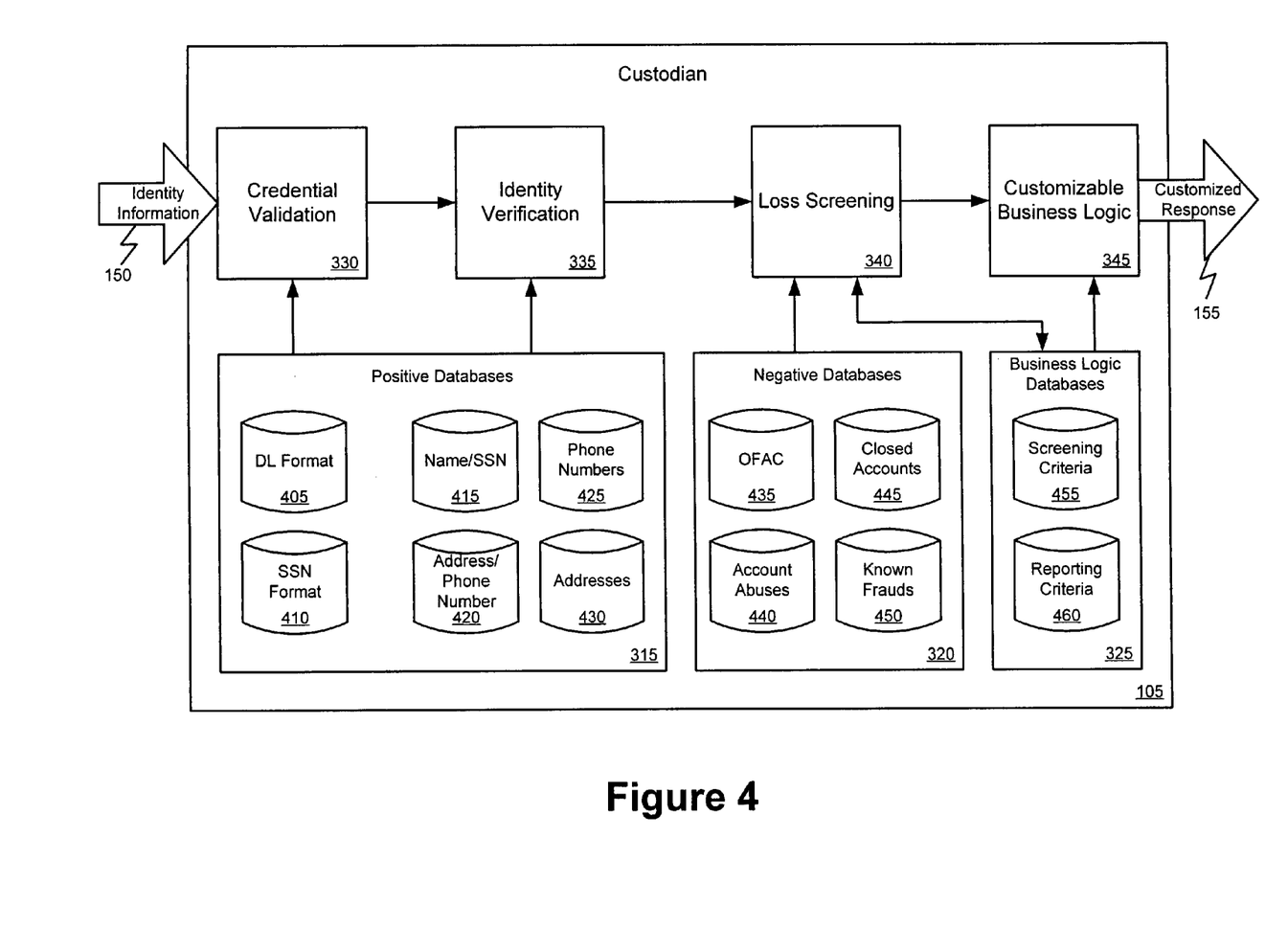
FIG. 4 is a block diagram illustrating exemplary databases that may be used in a custodian system according to one embodiment.

FIG. 4 is a block diagram illustrating exemplary databases that may be used in a custodian system according to one embodiment. As discussed above, the custodian system 105 receives the identity information 150 from the requesting financial institution 135 and performs credential validation 230 and identity verification 335 using information from positive databases 315 generated and maintained by database management system 305 with data from contributors 110-130 or generated or obtained by the custodian system by other means. Credential validation 330 determines whether the credentials used by the individual to provide the identity information 150 are valid while identity verification 335 determines whether the identity information 150 actually belongs to the individual presenting it.

Generally speaking, credential validation 330 can comprise determining whether the credential presented to the requesting financial institution 135 is valid, i.e., not forged, altered, expired, etc. This determination can be based on information in one or more positive databases 315 relating to the format and/or content of the identity information 150. In some cases, such as when reading information from a magnetic strip on a driver's license, verification may also include algorithms for decoding information contained therein and/or verifying the format of such data.

For example, positive databases 315 may include driver's license format information 405 and Social Security Format information 410. Driver's license format information 405 may be information related to the correct format and/or content of information scanned or read from a driver's license. Such information may be contributed by or obtained from the Department of Motor Vehicles of various states. Such information may be used to determine, for example, whether a driver's license number scanned or read from a driver's license is in the correct format for that state or whether the number matches the name on the license. Similarly, Social Security Format information 410 may be information related to the correct format and/or content of a Social Security Number submitted by an individual to the requesting financial institution. Such information may be contributed by or obtained from the Social Security Administration. Such information may be used to determine, for example, whether a submitted Social Security Number is in the correct format, is in the proper range for its issue date, is not that of a deceased person, etc.

While not indicated in FIG. 4, credential validation may, in some cases, use information from the business logic databases 325. For example, when a defect or mismatch is found in the identity credential, the defect or mismatch may be given a weighted score or ranking based on criteria stored in the business logic databases 325.

Identity verification 335 generally can comprise determining whether the individual presenting the credential to requesting financial institution 135 is who he claims to be. This determination can be based on information in one or more positive databases 315 relating to the content of the identity information 150.

For example, positive databases 315 may include a name and Social Security database 415 relating a list of known social security numbers to names of the holder of that number. Positive databases 315 may also include a list of phone numbers 425 that can be checked to determine whether a phone number submitted by an individual is active, whether it is a cell phone number, or other information relating to the number. A list of phone numbers and related addresses 420 may also be used to verify whether the phone number and address given by an individual correspond to one another. This list of addresses and phone numbers 420 or a separate list of addresses 430 can also be used to determine whether an address given by an individual is a business address, home address, temporary/transient address, etc.

While not indicated in FIG. 4, identity verification may, in some cases, use information from the business logic databases 325. For example, when a defect or mismatch is found in the identity information, the defect or mismatch may be given a weighted score or ranking based on criteria stored in the business logic databases 325.

The identity information 150 submitted to the custodian system 105 by requesting financial institution 135 can then be screened 340 against one or more negative databases. As outlined above, the negative databases 320 can comprise information 135 related to fraud, account abuses, or other losses submitted by one or more contributors 110-130. For example, contributing financial institution 115 may have submitted information 135 related to a loss it incurred when dealing with Mr. John Doe. Subject to operating rules implemented by the custodian system to maintain the quality of the information, this information 135 can be added to and maintained in the one or more negative databases 320 by database management system 305 and searched against by screening processor or operational module 340. Therefore, the loss suffered by contributing financial institution 115 can be discovered and used to score or rate Mr. Doe when his identity information 150 is submitted by requesting financial institution 135.

As shown here, negative databases 320 may include information from the Office of Foreign Asset Control (OFAC) related to prohibited individuals and/or organizations. The Office of Foreign Assets Control maintains a list of Specially Designated Nationals and Blocked Entities (SDNs). This list represents individuals and entities that are owned, controlled by, or acting for or on behalf of the governments of the targeted countries or are associated with international drug trade or terrorism. Financial institutions, securities firms, and insurance companies are prohibited from dealing with SDNs, and obligated to block or "freeze" property and payment of any funds transfers or transactions, and to report all blockings to OFAC.

Negative databases 320 may also include a list of known account abuses 440 such as an excessive number of overdrafts or other activities that may not necessarily represent fraud but caused a loss to the financial institution anyway. The negative databases may also include a list of closed accounts 445 that can be searched to determine whether the individual has had an account closed for cause. A list of known frauds 450 may also be included and searched to determine whether a contributor has provided information indicating a past fraud by the individual.

As will be discussed in greater detail below with reference to FIGS. 5 and 6, screening 340 can be customized by the requestor. Since not all losses suffered by contributors may be considered relevant to the requester, information previously submitted to the custodian system 105 by the requestor and stored by database management system 305 in one or more business logic databases 325 can be used by screening process 340 to determine which negative information may be relevant to the requestor. For example, one particular requestor may be extremely conservative and may want to learn about any loss associated with an individual at any time by any contributor. Another requestor may be somewhat less conservative and may have different criteria for searching the negative databases. Such a requestor may want to search only for losses of greater than some predefined dollar amount. Yet another requestor may be interested only in losses of more than a certain dollar amount and only those occurring within a certain time period such as the past year or two years. Therefore, business logic databases may include screening criteria 455 related to a particular requestor indicating a range of data to be searched, databases to be included or excluded, limits for determining matches, weights to be used in scoring or rating matches, etc.

Results of credential validation 330, identity verification 335, and screening 340 can then be accumulated and/or summarized by customizable business logic 345 using reporting criteria 460 previously submitted to the custodian system 105 by the requestor and stored by database management system 305 in one or more business logic databases 325 to provide a customized response 155 to the requester. The type of response may vary depending upon the requester and the reporting criteria 460 for that requestor in the business logic database 325. As mentioned above, responses can, according to one embodiment, be given in the form of various flags such as a green flag, yellow flag, or red flag indicating the level of confidence the requestor can have in doing business with the individual. The rating or score of an individual, as a result of the credential validation, identity verification, and screening processes, can be used to determine what level of indication to give. As such, various requestors may indicate a different score to trigger each level. That is, one requester may request a yellow flag or a red flag at a higher of lower score than another requestor. Various other types of responses may also be given. For example, a raw score, as the result of the credential validation, identity verification, and screening processes may be given to the requestor rather than flags. In another example, the response may be a rating on a numeric scale such as 1 to 5, or 1 to 10, etc. In some cases, a detailed message in the form of an HyperText Markup Language (HTML), eXtensible Markup Language (XML), or other document may be sent to the requester. Such a document may include detailed results of the credential validation 330, identity verification 335, and screening 340 processes and indicate results including but not limited to the identity of the contributor(s), the amount of the loss(es), the date(s) the loss(es) occurred, etc.

Figure 5:
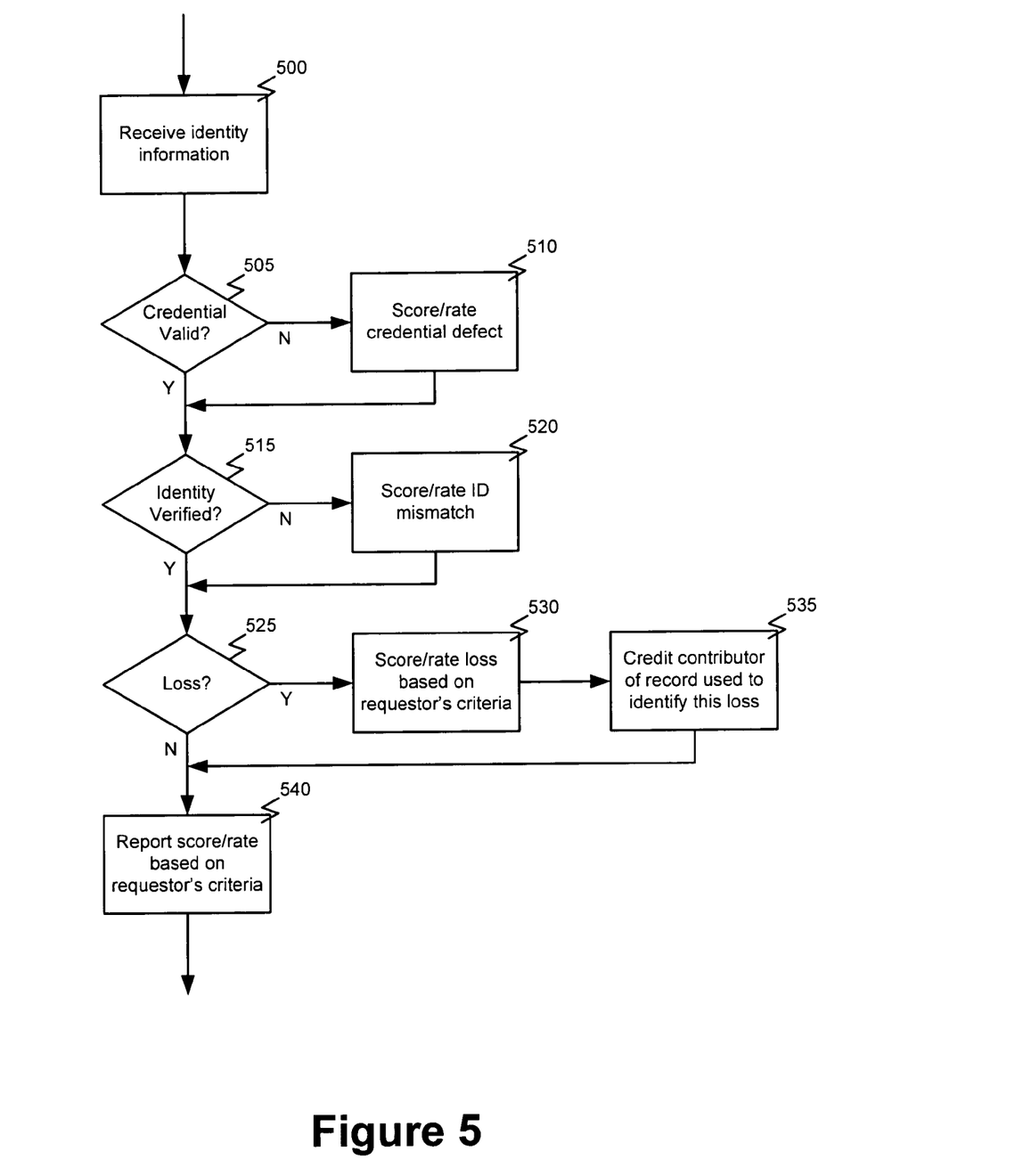
FIG. 5 is a flowchart illustrating, at a high level, positive identification and risk evaluation according to one embodiment.
Figure 6:
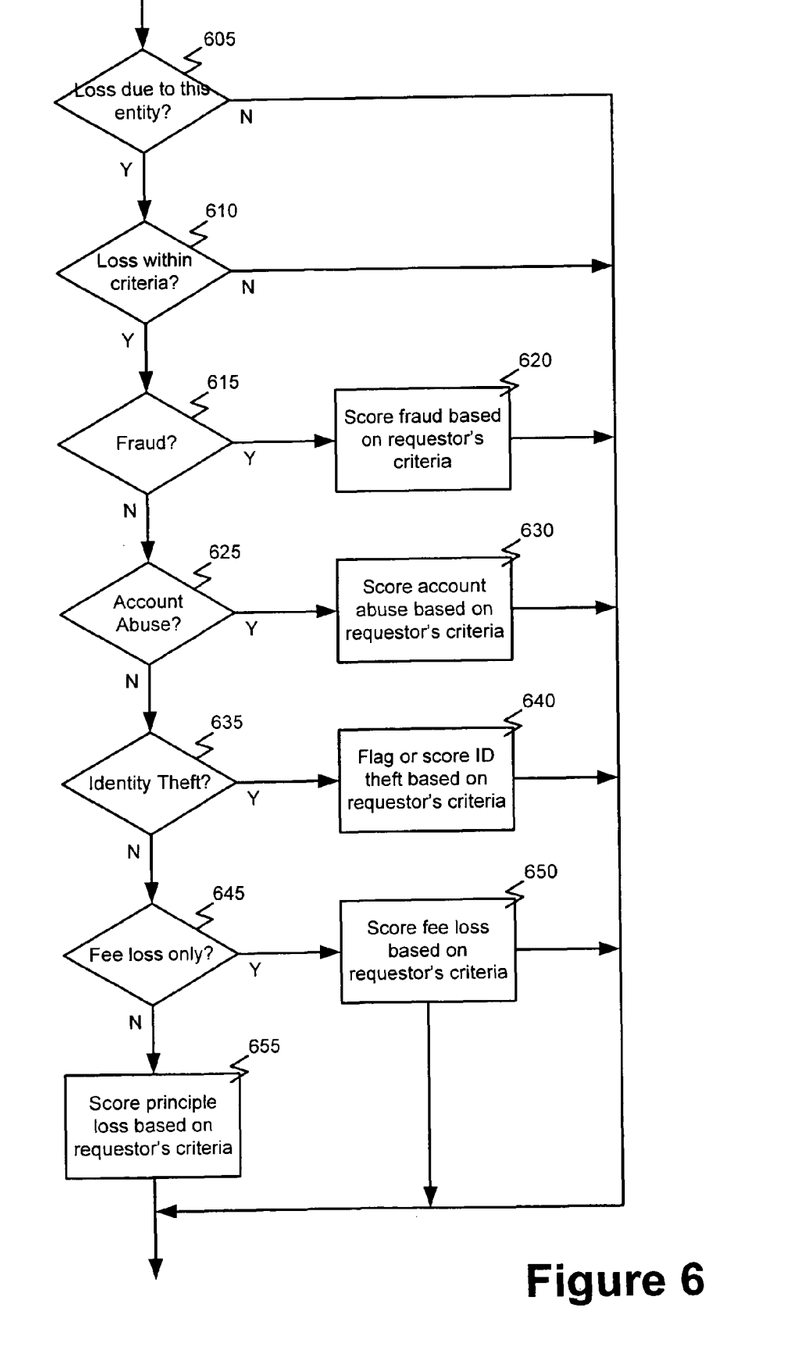
FIG. 6 is a flowchart illustrating additional details of risk evaluation according to one embodiment.

FIG. 5 is a flowchart illustrating, at a high level, positive identification and risk evaluation according to one embodiment. According to this example, evaluating a risk from conducting business with an individual comprises the custodian system receiving 500 identity information related to the individual from, for example, a requesting financial institution or other requestor. As discussed above, the identity information includes information from an identity credential presented by the individual such as a driver's license number scanned or read from a driver's license, a social security number provided by the individual, etc.

The custodian system determines 505 whether the identity credential is valid based on the information from the identity credential and one or more positive databases. For example, a driver's license number can be screened against information related to correct and/or valid numbers. If the credential is determined 505 to be defective, i.e., not valid, a score or rating can be generated 510 by the custodian system. In some cases, the score or rating may also be based, in part, on criteria from the requestor such as a weight to be applied to such a defect. Alternatively, the custodian system can generate a rating for the identity credential even if valid. That is, rather than scoring or rating only defects, the rating may be generated for all credentials with, for example, a high rating for a valid credential and a low rating for invalid credentials. In yet another alternative, a defective credential may not be scored at all. Rather, the process may end and a warning given to the requestor. The manner in which a defective credential is handled may depend, in part or in whole, on information submitted by the requester and stored in the business logic databases of the custodian as discussed above.

The custodian system determines 505 whether the identity of the entity is verified based on the identity information from the requester and one or more positive databases. For example, the name, phone number, address, Social Security Number, etc. supplied in the identity information can be checked against the positive databases as described above. If the identity information is determined 515 to be not verified, i.e., not matching, a score or rating can be generated 510 by the custodian system. In some cases, the score or rating may also be based, in part, on criteria from the requestor such as a weight to be applied to such a mismatch. Alternatively, the custodian system can generate a rating for the identity information even if verified. That is, rather than scoring or rating only mismatches, the rating may be generated for all identity information with, for example, a high rating for a verified information and a low rating for unverified information. In yet another alternative, unverified information may not be scored at all. Rather, the process may end and a warning given to the requestor. The manner in which identity information is handled may depend, in part or in whole, on information submitted by the requestor and stored in the business logic databases of the custodian as discussed above.

The identity information is screened against one or more negative databases indicating past losses to one or more entities. That is, the custodian determines 525 whether loss information related to the individual is found in the negative databases. If 525 loss information is found in the negative databases related to the individual, the loss can be scored or rated 530 based on the loss information and the criteria of the requestor. In other words, the custodian system can generate a risk rating for the individual based on the identity information, one or more negative databases indicating past losses to one or more entities, and risk criteria provided by an entity considering doing business with the individual.

As discussed above, the information indicating past losses to one or more entities in the negative databases can be submitted to the negative databases by the one or more entities incurring the past losses. Further, a fee can be credited 535 to the one or more entities submitting the information indicating past losses. That is, the contributing financial institution can be paid when the information it supplies adds value to the negative databases and is useful to a requesting financial institution.

The custodian system reports 540 results of said screening based on one or more criteria of an entity considering doing business with the individual. Reporting 540 the risk rating for the individual can be based on one or more report criteria of the entity considering doing business with the individual. Report of the results can comprise reporting the score in a format selected by the entity considering doing business with the individual. For example, the custodian system may report a flag, a rating or score, a detailed message, etc. based on the reporting criteria supplied by the requestor as discussed above.

According to one embodiment, risk evaluation, i.e., screening against the negative databases for losses associated with the entity for whom the requestor has submitted identity information, may screen for a variety of different types of losses, with each type being handled according to the requestor's criteria for that type of loss. FIG. 6 is a flowchart illustrating additional details of risk evaluation according to one embodiment. In this example, the custodian system determines 605 whether loss information in the negative databases is associated with the entity for which identity information has been received from the requester. If 605 the loss is associated with this entity, a determination 610 is made as to whether the loss is within the requestor's criteria. That is, the requestor may not be interested in all losses as indicated by previously submitted screening criteria. Therefore, this criteria is checked to determine 610 whether the requestor may be interested in knowing of this loss.

If 610 the loss is within the requestor's criteria, the custodian system determines 615 whether the information indicates past losses due to fraud by the individual. If 615 the information indicates past losses due to fraud by the individual, the fraud can be scored 620 or rated based on the requestor's criteria.

If 615 the loss is not due to fraud by the individual, the custodian system determines 625 whether the information indicates past losses due to account abuse by the individual. If 625 the information indicates past losses due to account abuse by the individual, the abuse can be scored 630 or rated based on the requestor's criteria.

If 625 the loss is not due to account abuse by the individual, the custodian system determines 635 whether the information indicates past losses due to the individual being a victim of identity theft. If 635 the information indicates past losses due to the individual being a victim of identity theft, the loss can be flagged or scored 640 or rated based on the requestor's criteria.

If 635 the loss is not due to the individual being a victim of identity theft, the custodian system determines 645 whether the information indicates the past losses are fee losses only or include principal losses. If 645 the information indicates past loss of fees only, the loss can be scored 640 or rated based on the requestor's criteria. Similarly, if the loss includes principal, the loss can be scored or rated based on the requestor's criteria for such losses.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of evaluating a risk from conducting business with an individual, the method comprising:
   receiving, at a processor of a custodian system, identity information related to the individual the identity information including information from an identity credential presented by the individual;
   validating, with the processor of the custodian system, the identity credential based on the information from the identity credential and a plurality of positive databases maintained by the custodian system;
   verifying, with the processor of the custodian system, an identity of the individual based on the identity information and the plurality of positive databases;
   screening, with the processor of the custodian system, the individual against a plurality of negative databases maintained by the custodian system based on the identity information for entries related to the individual and indicating past financial losses to one or more entities, and wherein screening is further based on one or more screening criteria maintained by the custodian system and provided to the custodian system by an entity considering doing business with the individual;
   generating, with the processor of the custodian system, a score based on the validation of the identity credential, the verification of the identity of the individual, and the screening of the individual, wherein the score represents an amount of risk posed by the individual to the entity considering doing business with the individual; and
   reporting, from the processor of the custodian system, the generated score based on one or more reporting criteria, the reporting criteria maintained by the custodian system and provided to the custodian system by the entity considering doing business with the individual.

2. The method of claim 1, wherein reporting the generated score comprises reporting the generated score in a format selected by the entity considering doing business with the individual.

3. The method of claim 1, wherein information indicating past financial losses to one or more entities in the negative databases is submitted to the custodian system by the one or more entities incurring the past financial losses.

4. The method of claim 3, further comprising crediting a fee to the one or more entities submitting the information indicating past financial losses.

5. The method of claim 3, wherein the information indicating past financial losses indicates financial losses due to fraud by the individual.

6. The method of claim 3, wherein the information indicating past financial losses indicates financial losses due to account abuse by the individual.

7. The method of claim 3, wherein the information indicating past financial losses indicates financial losses due to the individual being a victim of identity theft.

8. The method of claim 1, wherein the information indicating past financial losses separately indicates financial losses of fee revenue.

9. A method comprising:
receiving, at a processor of a custodian system, identity information related to an individual the identity information including information from an identity credential presented by the individual;
generating, with the processor of the custodian system, a validity rating for the identity credential based on the information from the identity credential and one or more positive databases maintained by the processor of the custodian system;
generating, with the processor of the custodian system, a verification rating for an identity of the individual based on the identity information and the one or more positive databases;
generating, with the processor of the custodian system, a risk rating for the individual based on the identity information, one or more negative databases maintained by the custodian system indicating past financial losses to one or more entities related to the individual, and risk criteria provided by an entity considering doing business with the individual;
generating, with the processor of the custodian system, a score based on the validity rating, the verification rating, and the risk rating, wherein the score represents an amount of risk posed by the individual to the entity considering doing business with the individual; and
reporting, from the processor of the custodian system, the generated score based on one or more report criteria provided to the custodian system by the entity considering doing business with the individual, wherein the one or more report criteria is maintained by the custodian system.

10. The method of claim 9, wherein information indicating past financial losses to one or more entities in the negative databases is submitted to the custodian system by the one or more entities incurring the past financial losses.

11. The method of claim 10, further comprising crediting a fee to the one or more entities submitting the information indicating past financial losses.

12. The method of claim 10, wherein the information indicating past financial losses indicates financial losses due to fraud by the individual.

13. The method of claim 10, wherein the information indicating past financial losses indicates financial losses due to account abuse by the individual.

14. The method of claim 10, wherein the information indicating past financial losses indicates financial losses due to the individual being a victim of identity theft.

15. The method of claim 9, wherein the information indicating past financial losses separately indicates financial losses of fee revenue.

16. A system comprising:
a processor; and
a memory communicatively connected with and readable by the processor and containing instructions which, when executed by the processor, cause the system to:
receive identity information related to the individual the identity information including information from an identity credential presented by the individual;
validate identity credential based on the information from the identity credential and a plurality of positive databases maintained by a custodian system;
verify an identity of the individual based on the identity information and the plurality of positive databases;
screen the individual against a plurality of negative databases maintained by the custodian system based on the identity information for entries related to the individual and indicating past financial losses to one or more entities, and wherein screening is further based on one or more screening criteria maintained by the custodian system and provided to the custodian system by an entity considering doing business with the individual;
generate, with the processor of the custodian system, a score based on the validation of the identity credential, the verification of the identity of the individual, and the screening of the individual, wherein the score represents an amount of risk posed by the individual to the entity considering doing business with the individual; and
report the generated score based on one or more reporting criteria, the reporting criteria maintained by the custodian system and provided to the custodian system by the entity considering doing business with the individual.

17. The system of claim 16, wherein reporting the generated score comprises reporting the generated score in a format selected by the entity considering doing business with the individual.

18. The system of claim 16, wherein information indicating past financial losses to one or more entities in the negative databases is submitted to the system by the one or more entities incurring the past financial losses.

19. The system of claim 18, further comprising crediting a fee to the one or more entities submitting the information indicating past financial losses.

20. The system of claim 18, wherein the information indicating past financial losses indicates financial losses due to fraud by the individual.

21. The system of claim 18, wherein the information indicating past financial losses indicates financial losses due to account abuse by the individual.

22. The system of claim 18, wherein the information indicating past financial losses indicates financial losses due to the individual being a victim of identity theft.

23. The system of claim 16, wherein the information indicating past financial losses separately indicates financial losses of fee revenue.

* * * * *